United States Patent Office 3,794,656
Patented Feb. 26, 1974

3,794,656
SUBSTITUTED 3-PYRIDINEMETHANOLS AND METHANES
Earle M. Van Heyningen, Indianapolis, Ind., assignor to Eli Lilly and Company, Indianapolis, Ind.
No Drawing. Continuation of application Ser. No. 814,850, Apr. 9, 1969, which is a continuation-in-part of application Ser. No. 553,815, Mar. 14, 1966. This application Nov. 30, 1971, Ser. No. 203,480
Int. Cl. C07d 31/24, 31/28
U.S. Cl. 260—290 R
6 Claims

ABSTRACT OF THE DISCLOSURE

Novel substituted 3-pyridinemethanols and methanes and nonphytotoxic acid addition salts thereof useful in controlling fungi which attack turf, food crops, and ornamental plants.

---

This is a continuation of application Ser. No. 814,850, filed Apr. 9, 1969, which in turn is a continuation-in-part of our copending application Ser. No. 553,815, filed Mar. 14, 1966.

BACKGROUND OF THE INVENTION

In the prior art, Sperber et al., U.S. Pat. 2,727,895 (Dec. 20, 1955), teach that pyridyl methane derivatives possess antifungal and antibacterial properties, the preferred compounds therein being the 4-pyridyl methane derivaties in which the pyridine moiety is substituted in the 4-position, the compounds to be administered in a variety of the usual pharmaceutical forms, thus being directed toward human use. In our hands, these compounds of Sperber et al. showed minimal activity against plant fungi.

Also in the prior art, Van Heyningen, U.S. Pat. 3,396,-224 (Aug. 6, 1968), discloses the use of 3-pyridinemethanols and derivatives against fungi pathogenic to food crops, and to ornamental plants such as roses.

Further, Van Heyningen et al., U.S. Pat. 3,397,273 (Aug. 13, 1968), teach the use of 3-pyridinemethanes as fungicides for plant pathogenic fungi.

Summary

This invention relates to novel substituted 3-pyridine- methanols and methanes of the formula:

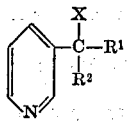

wherein

X is hydrogen or hydroxyl;
$R^1$ is phenyl, 4-chlorophenyl, or cyclohexyl;
$R^2$ is $C_4$–$C_8$ cycloalkenyl or $C_3$–$C_8$ cycloalkyl; and the nonphytotoxic acid addition salts thereof.

The novel compounds of this invention are useful in controlling fungi which attack turf, food crops, and ornamental plants.

Description

This invention relates to novel substituted 3-pyridine-methanols and methanes of the formula set forth hereinabove, and the fungicidal properties thereof.

In the generaic formula, $C_4$–$C_8$ cycloalkenyl means mono-unsaturated cyclic aliphatic hydrocarbon radicals having 4–8 carbons in the ring and can be illustratively 1-cyclobutenyl, 1-cyclopentenyl, 1-cyclohexenyl, 1-cycloheptenyl, and 1-cyclooctenyl.

$C_3$–$C_8$ cycloalkyl means saturated cyclic aliphatic hydrocarbon radicals having 3 to 8 carbons in the ring and can be illustratively cyclopropyl, cyclobutyl, cyclopentyl, cyclohexyl, cycloheptyl, and cyclooctyl.

Suitabe nonphytotoxic acid addition salts of the pyridine bases represented by the above formula can be prepared employing, for example, the following acids: hydrochloric, hydrobromic, sulfuric, phosphoric, nitric, oxalic, methanesulfonic, p-toluenesulfonic, maleic, and the like.

The novel compounds of the present invention have been found useful in controlling fungi which attack turf, food crops, and ornamental plants.

The novel compounds of this invention possess the entirely unexpected and unforeseen ability to control turf pathogens which yearly afflict great damage to turf, such control being accomplished at lower rates of application than any other materials available up until the present time. These organisms include: *Helminthosporium sativum*, the causative organism of Leaf Spot; *Rhizocotina solani*, the causative organism of Brown Patch; *Sclerotinia homeocarpa*, the causative organism of Dollar Spot; *Fusarium roseum*, the causative organism of Root Rot; and *Pythium sp.*, the causative organism of Pythium Blight.

Among the fungi which attack food crops and which are susceptible to control by the compounds of the present invention are *Erisyphe polygoni*, the causative organism of bean powdery mildew; *Pyricularis oryzae*, the causative organism of rice blast; *Colletotrichum lagenarium*, the causative organism of cucumber anthracnose; and *Uromyces phaseoli*, the causative organism of bean rust.

Among the susceptible fungic which affect ornamental plants are *Sphaerotheca pannosa* var. *rosae*, the causative organism of powdery mildew of rose; and *Erisyphe graminis*, the causative organism of powdery mildew of turf.

The following examples illustrate the usefulness of the novel compounds of the present invention for the control of fungi pathogenic to turf and to food crops.

EXAMPLE 1

The novel pyridine compounds of this invention were tested against the following fungi pathogenic to turf: *Rhizoctonia solani*, the causative organism of Brown Patch; *Sclerotinia homoeocarpa*, the causative organism of Dollar Spot; and *Helminthosporium sativum*, the causative organism of Leaf Spot.

Turf used in the testing was obtained from field plots of established grasses. The turf was cut, using a cup cutter 4.5 inches in diameter, and the turf was placed immediately in pint-sized plastic containers. All the turf was stored under Gro-lux lights in the greenhouse until needed for use. The seaside variety of bent grass was used as host for *Rhizoctonia solani* and *Sclerotinia homoeocarpa*, and barley was used as the host for *Helminthosporium sativum*.

Fungicidal compositions were prepared by dissolving 40 mg. of the compound to be tested in 1 ml. of a solution of cyclohexanone containing 55 mg. of sulfonate non-ionic blend (Toximul R and S, Stepan Chemical Company, Northfield, Ill.) and diluting to a volume of 100 ml. with water. This composition then contained 400 p.p.m. of fungicide. To prepare a composition containing 1000 p.p.m., 100 mg. of the compound to be tested was dissolved in 1 ml. of the cyclohexanone-sulfonate non-ionic blend solution and then diluted to a volume of 100 ml. with water.

For those compounds not soluble in the solvent mixture of cyclohexanone and sulfonate non-ionic blend, a mixture containing 50 percent acetone and 50 percent ethanol was used.

Three replicates were run on each compound tested along with three replicates for solvent check, three replicates for untreated check, and three replicates for uninoculated check.

A commercially available fungicide was also run as a check at its recommended rate of five pounds per acre. A total of 45 pots of turf per disease were run simultaneously. The pots of turf were numbered from 1 to 45, in order, as placed on a cart moist chamber, and each compound assigned three numbers at random. The pots of turf were inoculated by shaking a measured amount of vermiculite-grown inoculum over the grass. The inoculated pots of turf, with numbers corresponding to a given compound were removed from the cart, sprayed with the test composition, and replaced on the cart moist chamber in their original location. The pots of turf were then incubated under the proper temperature and humidity conditions, as follows:

*Rhizoctonia solani* was incubated at a temperature of about 80–85° F. at 90–100 percent relative humidity for about 48–72 hours.

*Sclerotinia homoeocarpa* was incubated at a temperature of about 70–80° F. at 90–100 percent relative humidity for about 24–48 hours.

*Helminthosporium sativum* was incubated at a temperature of about 70–75° F. at 100 percent relative humidity for about 4–5 days.

At the end of the respective incubation periods, the pots of turf were examined for symptoms of the diseases and the ratings of the control of the fungi were recorded.

The control rating scale used was as follows:

1—no control
2—slight control
3—moderate control
4—good control
5—complete control, no fungus Chart 1 which follows, sets forth the results of the testing of the novel compounds of this invention against the three turf pathogenic fungi named above. In the chart, column 1 gives the name of the compound; column 2, the rate of lbs./acre at which the compound formulated as described above, was applied to the turf; and columns 3, 4, and 5, the control ratings of the compounds. In the chart, at columns 3, 4, and 5 respectively, R=*Rhizoctonia solani*; S=*Sclerotinia homoeocarpa*; and H=*Helminthosporium sativum*.

CHART 1

| Compound | Application rate, lbs./acre | H | R | S |
|---|---|---|---|---|
| α-Cyclobutyl-α-phenyl-3-pyridinemethanol. | 2.0 | 4 | 5 | 5 |
| | 1.0 | 4 | 4.3 | 4.6 |
| | 0.5 | 3 | 4.3 | 5 |
| | 0.25 | 4 | 4 | 5 |
| | 0.125 | 3 | 2 | 5 |
| 3-dicyclohexylmethyl pyridine | 2.0 | 4.6 | 5 | 5 |
| | 1.0 | 4 | 5 | 5 |
| | 0.5 | 3 | 5 | 4.6 |
| | 0.25 | 4 | 4 | 5 |
| | 0.125 | 3 | 3.5 | 4.5 |
| | 0.06 | 1 | 4 | 4 |
| | 0.03 | 1 | 3 | 4 |
| α-Cyclohexyl-α-phenyl-3-pyridinemethanol. | 2.0 | 4 | 5 | 5 |
| | 1.0 | 5 | 5 | 5 |
| | 0.5 | 4.5 | 5 | 5 |
| | 0.25 | 4 | 5 | 5 |
| | 0.125 | 4 | 4 | 4.5 |
| | 0.06 | 2 | 5 | 5 |
| | 0.03 | 2 | 4 | 3 |
| α-Cyclohexyl-α-phenyl-3-pyridinemethanol hydrochloride. | 2.0 | 4 | 5 | 5 |
| | 1.0 | 4 | 5 | 4 |
| | 0.5 | 3.5 | 5 | 4 |
| | 0.25 | 4 | 4 | 4 |
| | 0.125 | 3 | 5 | 4 |
| | 0.06 | 3 | 5 | 4 |
| | 0.03 | 2 | 4 | 3 |
| α-(4-chlorophenyl)-α-cyclohexyl-3-pyridinemethanol hydrochloride. | 2.0 | 4 | 5 | 5 |
| | 1.0 | 5 | 5 | 5 |
| | 0.5 | 5 | 5 | 5 |
| | 0.25 | 4 | 5 | 4 |
| | 0.125 | 2 | 4 | 2 |
| | 0.06 | 1 | 3 | 2 |
| | 0.03 | 1 | 2 | 2 |
| | 0.015 | 1 | 1 | 1 |

CHART 1—Continued

| Compound | Application rate, lbs./acre | H | R | S |
|---|---|---|---|---|
| α,α-Bis(cyclohexyl)-3-pyridinemethanol. | 2.0 | 4.6 | 5 | 5 |
| | 1.0 | 4.3 | 5 | 5 |
| | 0.5 | 3.3 | 5 | 5 |
| | 0.25 | 2 | 5 | 5 |
| | 0.125 | 1.3 | 5 | 5 |
| | 0.06 | 1.6 | 4.6 | 4.6 |
| | 0.03 | 1 | 4.3 | 4.6 |
| | 0.015 | 1 | 3.3 | 3.3 |

EXAMPLE 2

To assay the fungicidal effect of the novel compounds against *Erysiphe polygoni*, the causative organisms of bean powdery mildew, the following procedure was utilized.

Three bean seeds (Kentucky Wonder variety) were planted in 4-inch clay pots and allowed to germinate, and the plants were thinned to two plants per pot. Ten days from the day of planting, the test chemicals, compounded as described above in Example 1, were sprayed on all leaf surfaces of the bean plants and allowed to dry. The plants were then placed in the greenhouse and other Kentucky Wonder beans heavily infested with powdery mildew were placed above the test plants for about five days and then removed.

At the end of five additional days, the test plants were observed for development of the disease. The appearance of the treated plants was compared with that of check plants, and ratings of the control of the fungus were recorded. The control rating scale used was the same as that used in Example 1.

Chart 2, which follows, sets forth the results of the testing of the novel compounds against *Erysiphe polygoni*. In the chart, column 1 gives the name of the compound; column 2, the rate in terms of parts per million (p.p.m.) at which the compound was applied to the test plants; and column 3, the protection (control) rating of the compound.

CHART 2

| Compound | Application rate, p.p.m. | Protection rating |
|---|---|---|
| α,α-Bis(cyclohexyl)-3-pyridylmethane | 400 | 5 |
| | 80 | 3— |
| α-Cyclohexyl-α-phenyl-3-pyridylmethane | 400 | 5 |
| | 80 | 5 |
| | 16 | 4— |
| α-Cyclohexyl-α-(1-cyclohexenyl)-3-pyridylmethane | 400 | 4 |
| α-(4-chlorophenyl)-α-cyclopropyl-3-pyridine methanol | 400 | 5 |
| | 80 | 5 |
| | 16 | 4 |
| | 3.2 | 3+ |
| α-Cyclohexyl-α-phenyl-3-pyridylmethanol | 400 | 5 |
| | 80 | 5 |
| | 16 | 4+ |
| α-Cyclohexyl-α-phenyl-3-pyridinemethanol hydrochloride | 400 | 5 |
| | 80 | 5 |
| | 16 | 2 |
| α,α-Bis(cyclohexyl)-3-pyridinemethanol | 400 | 5 |
| | 80 | 5 |
| | 16 | 2 |
| α-Cyclohexyl-α-(2,5-methylcyclohexyl)-3-pyridinemethanol hydrochloride | 400 | 5 |
| α-(4-chlorophenyl)-α-(cyclohexyl)-3-pyridinemethanol hydrochloride | 400 | 5 |
| | 80 | 5 |
| | 16 | 3 |
| | 3.2 | 3 |
| α-Cyclobutyl-α-phenyl-3-pyridinemethanol | 400 | 5 |
| | 80 | 5 |
| | 16 | 3.5 |
| | 3.2 | 3 |
| α-(3-chlorophenyl)-α-(cyclohexyl)-3-pyridine methanol hydrochloride | 400 | 5 |

One method for synthesis of the trisubstituted methanols of the present invention is to add a solution of a Grignard reagent to a solution of a suitable organic ketone such as 3-pyridyl phenyl ketone, 3-pyridyl p-chlorophenyl ketone, or the like, and to maintain the mixture at a suitable temperature for a time sufficient to bring about substantial reaction thereof.

Alternatively, a solution of the ketone can be added to the Grignard reagent in ether or other suitable solvent.

Another preparative method is that taught by Wibaut et al., Rec. trav. chim., 77, 1057 (1958). According to the Wibaut et al. method, 3-pyridyllithium, prepared by the reaction of butyllithium with a 3-halopyridine in ether, is allowed to react in a nitrogen atmosphere with a suitable di-cycloalkyl ketone or arylcycloalkyl ketone in ether solution at a temperature of about $-50°$ to $-60°$ to yield a 3-pyridyl disubstituted methanol.

The trisubstituted methanes of the present invention are prepared by heating the trisubstituted methanols in a mixture of glacial acetic acid, concentrated hydrochloric acid, and aqueous 47 percent hydriodic acid to reduce the hydroxyl groups, as taught by Sperber et al., U.S. Pat. 2,727,895 (Dec. 20, 1955). The compounds thus obtained are 1-cycloalkenyl-phenyl (or cycloalkyl)-3-pyridylmethanes, which have fungicidal activity in their own right and which are hydrogenated by methods well known to the art to reduce the cycloalkenyl group and yield the trisubstituted methanes.

For example, $\alpha,\alpha$-bis(cyclohexyl)-3-pyridinemethanol is heated in a mixture of glacial acetic acid, concentrated hydrochloric acid, and aqueous 47 percent hydriodic acid for about two hours. The reaction product mixture is poured into a mixture of water and sodium bisulfite, made basic with concentrated sodim hydroxide solution, and extracted with several volumes of ether. The ether solution is dried, the excess solvent removed in vacuo, and the residue distilled to yield $\alpha$-(1-cyclohexenyl)-$\alpha$-cyclohexyl-3-pyridylmethane. This methane is dissolved in a suitable solvent such as ethanol and hydrogenated catalytically to yield the desired $\alpha,\alpha$-bis(cyclohexyl)-3-pyridylmethane.

The following examples demonstrate the preparation of the novel compounds of this invention but are not to be considered to limit the scope thereof.

EXAMPLE 1

$\alpha,\alpha$-Bis(cyclohexyl)-3-pyridinemethanol

To a solution of 54 g. (0.13 mole) of butyllithium in 100 ml. of ether cooled to a temperature of $-60$ to $-70°$ C. in a nitrogen atmosphere was added a cooled ($-60$ to $-70°$ C.) solution of 16 g. (0.1 mole) of 3-bromopyridine in 100 ml. of ether. When the addition was complete, the reaction product mixture was stirred for about one-half hour at the same temperature.

To this solution maintained at $-50$ to $-60°$ C. in a nitrogen atmosphere was added a solution of 19.4 g. (0.1 mole) of dicyclohexyl ketone in ether, and when addition was complete, the mixture was stirred for about two hours at about $-50$ to $-60°$ C.

The reaction product mixture was warmed to room temperature, then mixed with 100 ml. of 10 percent aqueous ammonium chloride solution. The ether layer was separated and the aqueous layer extracted twice with 100 ml. portions of ether. The ether layer and the extracts were combined and extracted with 200 ml. of 1 N aqueous hydrochloric acid. The aqueous acidic solution was cooled, made basic with 50 percent sodium hydroxide solution, and extracted with ether. The ether layer was concentrated to leave a residue, which was recrystallized from a mixture of benzene and petroleum ether to yield $\alpha,\alpha$-bis(cyclohexyl)-3-pyridinemethanol having a melting point of about 121° C.

A sample of $\alpha,\alpha$-bis(cyclohexyl)-3-pyridinemethanol was dissolved in dry ether and the solution saturated in the cold with gaseous hydrogen chloride. The solid material thus obtained was recrystallized from a mixture of ethanol and ether to yield $\alpha,\alpha$-bis(cyclohexyl)-3-pyridinemethanol hydrochloride having a melting point of about 174–176° C.

Following the same general procedure described above and using appropriate starting materials, the following compounds were prepared:

$\alpha$-Cyclobutyl-$\alpha$-phenyl-3-pyridinemethanol. Melting point: 125–126° C.

$\alpha$-(4-chlorophenyl)-$\alpha$-cyclopropyl-3-pyridinemethanol. Melting point: 83–85° C.

$\alpha$-(4-chlorophenyl)-$\alpha$-cyclopropyl-3-pyridinemethanol hydrochloride. Melting point: 146° C.

$\alpha$-Cyclohexyl-$\alpha$-phenyl-3-pyridinemethanol. Melting point: 95° C.

$\alpha$-Cyclohexyl-$\alpha$-phenyl-3-pyridinemethanol hydrochloride. Melting point: 164° C.

EXAMPLE 2

$\alpha,\alpha$-Bis(cyclohexyl)-3-pyridylmethane

A mixture of 10 g. of $\alpha,\alpha$-bis(cyclohexyl)-3-pyridinemethanol, 20 ml. of glacial acetic acid, 20 ml. of aqueous 47 percent hydriodic acid, and 5 ml. of concentrated hydrochloric acid was heated for about two hours. The reaction product mixture was poured into a cold mixture of 100 ml. of water and 8 g. of sodium bisulfite. The mixture was made strongly basic with aqueous 50 percent sodium hydroxide and extracted with several volumes of ether. The combined ether extracts were dried, concentrated in vacuo, and the residual oil distilled to yield $\alpha,\alpha$-cyclohexyl-$\alpha$-(1-cyclohexenyl)-3-pyridylmethane having a boiling point of about 170° C./0.05 mm. It was identified by N.M.R. spectrum. Yield: 7 gm.

The $\alpha$-cyclohexyl-$\alpha$-(1-cyclohexenyl)-3-pyridylmethane was dissolved in ethanol and hydrogenated in a Parr shaker using palladinized charcoal catalyst. The reduction mixture was filtered to remove the spent catalyst and distilled to yield $\alpha,\alpha$-bis(cyclohexyl)-3-pyridylmethane as an oil having a boiling point of about 240° C./6 mm. Identified by N.M.R. spectrum. Yield: 6 gm.

Following the same general procedure as described above but using appropriate starting materials, the following compounds were prepared:

$\alpha$-(1-cyclohexenyl)-$\alpha$-phenyl-3-pyridylmethane. $n_D^{25} = 1.5883$.

$\alpha$-Cyclohexyl-$\alpha$-phenyl-3-pyridylmethane. Identified by N.M.R. spectrum.

I claim:

1. A compound of the formula

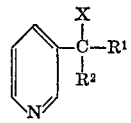

wherein
X is hydrogen or hydroxyl;
R$^1$ is phenyl, 4-chlorophenyl, or cyclohexyl;
R$^2$ is C$_3$–C$_8$ cycloalkyl; and the nonphytotoxic acid addition salts thereof.

2. A compound as in claim 1, said compound being $\alpha$-cyclohexyl-$\alpha$-phenyl-3-pyridinemethanol hydrochloride.

3. A compound as in claim 1, said compound being $\alpha,\alpha$-bis(cyclohexyl)-3-pyridinemethanol.

4. A compound as in claim 1, said compound being $\alpha$-cyclobutyl-$\alpha$-phenyl-3-pyridinemethanol.

5. A compound as in claim 1, said compound being $\alpha,\alpha$-bis(cyclohexyl)-3-pyridylmethane.

6. A compound as in claim 1, said compound being α-(4-chlorophenyl)-α-cyclopropyl-3-pyridinemethanol.

References Cited

UNITED STATES PATENTS

| | | | |
|---|---|---|---|
| 3,396,224 | 8/1968 | Van Heyningen | 260—297 |
| 3,397,273 | 8/1968 | Van Heyningen et al. | 260—290 |

FOREIGN PATENTS

| | | | |
|---|---|---|---|
| 1,512,567 | 1/1968 | France | 260—290 |

HARRY I. MOATZ, Primary Examiner

U.S. Cl. X.R.

260—297 R; 424—263